US011137096B2

(12) United States Patent
Sinico et al.

(10) Patent No.: US 11,137,096 B2
(45) Date of Patent: Oct. 5, 2021

(54) DEVICE FOR CONNECTING A PUMP BODY TO A PIPE OF A HYDRAULIC SYSTEM

(71) Applicant: DAB PUMPS S.P.A., Mestrino (IT)

(72) Inventors: Francesco Sinico, Montecchio Maggiore (IT); Enrico Trentin, Frazione Sorio (IT)

(73) Assignee: DAB PUMPS S.P.A, Mestrino (IT)

( * ) Notice: Subject to any disclaimer, the term of this patent is extended or adjusted under 35 U.S.C. 154(b) by 0 days.

(21) Appl. No.: 15/258,823

(22) Filed: Sep. 7, 2016

(65) Prior Publication Data

US 2017/0074435 A1 Mar. 16, 2017

(30) Foreign Application Priority Data

Sep. 14, 2015 (IT) .......................... 102015000051050

(51) Int. Cl.
| | |
|---|---|
| *F16L 23/028* | (2006.01) |
| *F04B 53/16* | (2006.01) |
| *F04D 29/60* | (2006.01) |
| *F04B 53/22* | (2006.01) |

(52) U.S. Cl.
CPC .......... *F16L 23/0283* (2013.01); *F04B 53/16* (2013.01); *F04B 53/22* (2013.01); *F04D 29/605* (2013.01)

(58) Field of Classification Search
CPC .... F16L 23/024; F16L 23/0286; F16L 23/028
USPC ......................................................... 285/414
See application file for complete search history.

(56) References Cited

U.S. PATENT DOCUMENTS

| | | | | |
|---|---|---|---|---|
| 255,163 | A * | 3/1882 | Goldschmid | F16L 9/08 285/414 |
| 1,232,129 | A * | 7/1917 | Wafer | F16L 19/0225 285/414 |
| 1,514,052 | A * | 11/1924 | Kaiser | F16L 23/20 285/414 |
| 1,572,781 | A * | 2/1926 | Farmer | F16L 35/00 285/414 |
| 1,956,683 | A | 5/1934 | Hewitt | |
| 2,211,983 | A * | 8/1940 | Parris | F16L 17/08 285/414 |
| 2,459,250 | A * | 1/1949 | Stillwagon | F16L 23/16 285/414 |
| 3,224,795 | A * | 12/1965 | Conley | F16L 23/024 285/405 |
| 3,918,919 | A * | 11/1975 | Walburg | B01J 3/042 285/414 |
| 4,919,391 | A * | 4/1990 | Kemp | F16L 23/032 285/414 |

(Continued)

FOREIGN PATENT DOCUMENTS

EP 2101063 9/2009

OTHER PUBLICATIONS

Italian Search Report IT UB20153607, date completed May 4, 2016.

*Primary Examiner* — David Bochna
(74) *Attorney, Agent, or Firm* — Ferguson Case Orr Paterson LLP

(57) ABSTRACT

A device for connecting a pump body to a pipe of a hydraulic system, characterized in that it comprises a planar flange having a thread on the inside diameter for its coupling to a tubular intake portion or delivery portion of said pump body, which is threaded complementarily on its outside diameter.

2 Claims, 2 Drawing Sheets

(56) References Cited

U.S. PATENT DOCUMENTS

| | | | | |
|---|---|---|---|---|
| 5,000,492 A * | 3/1991 | Kemp | ................... | F16L 23/032 |
| | | | | 285/414 |
| 5,492,373 A * | 2/1996 | Smith | ................... | F16L 23/024 |
| | | | | 285/414 |
| 6,283,157 B1 * | 9/2001 | Rocheleau | ............ | F16L 23/024 |
| | | | | 285/416 |
| 6,976,668 B2 * | 12/2005 | Weingarten | ......... | F16K 17/0453 |
| | | | | 285/414 |
| 9,228,682 B1 * | 1/2016 | Rocheleau | .......... | F16L 23/0283 |
| 2008/0048445 A1 * | 2/2008 | Lum | ..................... | F16L 23/024 |
| | | | | 285/368 |
| 2010/0230955 A1 * | 9/2010 | Pottier | ................ | F16L 23/0283 |
| | | | | 285/148.28 |
| 2015/0260320 A1 * | 9/2015 | Huang | ................ | F16L 23/0286 |
| | | | | 285/414 |

\* cited by examiner

DEVICE FOR CONNECTING A PUMP BODY TO A PIPE OF A HYDRAULIC SYSTEM

CROSS-REFERENCE TO RELATED APPLICATIONS

The disclosures in Italian Patent Application No. 102015000051050 (UB2015A003607) from which this application claims priority are incorporated herein by reference.

BACKGROUND OF INVENTION

Field of the Invention

The present invention relates to a device for connecting a pump body to a pipe of a hydraulic system.

Description of Related Art

Currently, a pump is often connected to a hydraulic pipe by using flange devices which comprise flanges at the end of the pipe and at the delivery and intake portions of the pump to be fixed by means of screws.

Sometimes tightening the flanges can be awkward for the operator, who has to work with a wrench or other tightening devices, owing to confined spaces in which to work, for example due to the space occupation of the pump or to vicinity to a wall.

Moreover, flanges that have an elliptical shape or have two connection portions that are extended symmetrically outward are widespread. The orientation of these flanges, welded to the ends of the pipe, influences the placement of the pump with respect to the pipe. Sometimes it can be necessary to install the pump in a position that is rotated about the axis of the pipe, for example due to space constraints. Flanges that are not axially symmetrical and integral with the ends of the pipes constrain the placement of the pump.

In order to obviate this drawback, so far flanges have been proposed which can rotate freely on the ends of the intake and delivery portions of the pump body about the axis of the pipe in order to assume positions that are compatible with the flanges of the pipes and with the placement requirements of the pump.

These flanges have a circular opening that is shaped complementarily to the flange of the delivery port and to the flange of the intake port on the pump body side. They are fitted by inserting the flanges of the pump body through their opening, and their adhesion to said flanges, after choosing the correct orientation, must be maintained during installation.

The instability that they exhibit during installation does not make this solution capable of obviating the drawback of the accidental fall of the flanges and does not facilitate the work of the installation technician.

Another solution consists of a flange to be coupled to the end of the pipe and provided, on the coupling part, with an internally threaded tubular portion for screwing the flange onto the pipe, which is appropriately threaded on the outside diameter. This solution replaces the welding of the flange to the pipe and therefore allows one to orient it as a function of the final installation position of the pump body.

In this manner it is possible to obviate the drawback of the instability of the flange during installation, but this solution can be utilized only with a pipe that is appropriately lacking a flange and is provided with an external thread. It is not applicable, therefore, to pipes with an already welded flange.

SUMMARY OF THE INVENTION

The aim of the present invention is to provide a device for connecting a pump body to a pipe of a hydraulic system that is capable of obviating the cited drawbacks.

Within this aim, an object of the invention is to provide a device which, during the installation of a pump body on a pipe, allows the rotation of the pump body with respect to the flanges of the pipe, which are normally already present, keeping the other two flanges stably on the intake and delivery portions of the pump body.

Another object of the invention is to propose a device that is structurally simple and easy to use.

This aim and these and other objects that will become better apparent hereinafter are achieved by a device for connecting a pump body to a pipe of a hydraulic system, characterized in that it comprises a planar flange having a thread on the inside diameter for its coupling to a tubular intake portion or delivery portion of said pump body, which is threaded complementarily on its outside diameter.

The patent also relates to a pump, comprising a device cited above, characterized in that it comprises, at the end of each tubular intake portion and delivery portion, a portion for coupling to a said planar flange.

BRIEF DESCRIPTION OF THE DRAWINGS

Further characteristics and advantages of the invention will become better apparent from the description of a preferred but not exclusive embodiment of the device according to the invention, illustrated by way of nonlimiting example in the accompanying drawings, wherein.

DETAILED DESCRIPTION OF THE INVENTION

Figure 1:
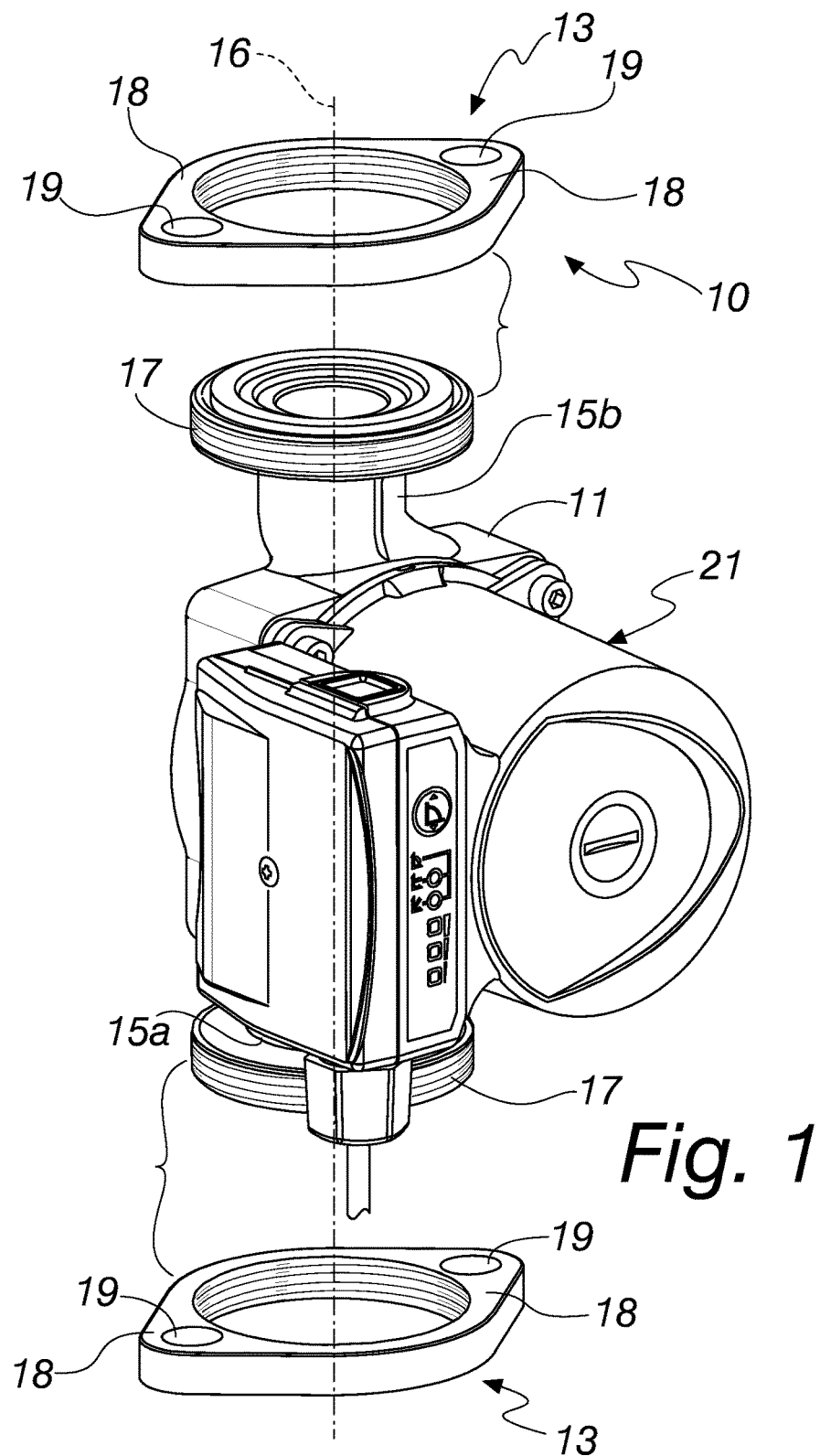
FIG. 1 is a perspective view of a pump body with two planar flanges of the device according to the invention prior to their coupling to the pump body.
Figure 2:
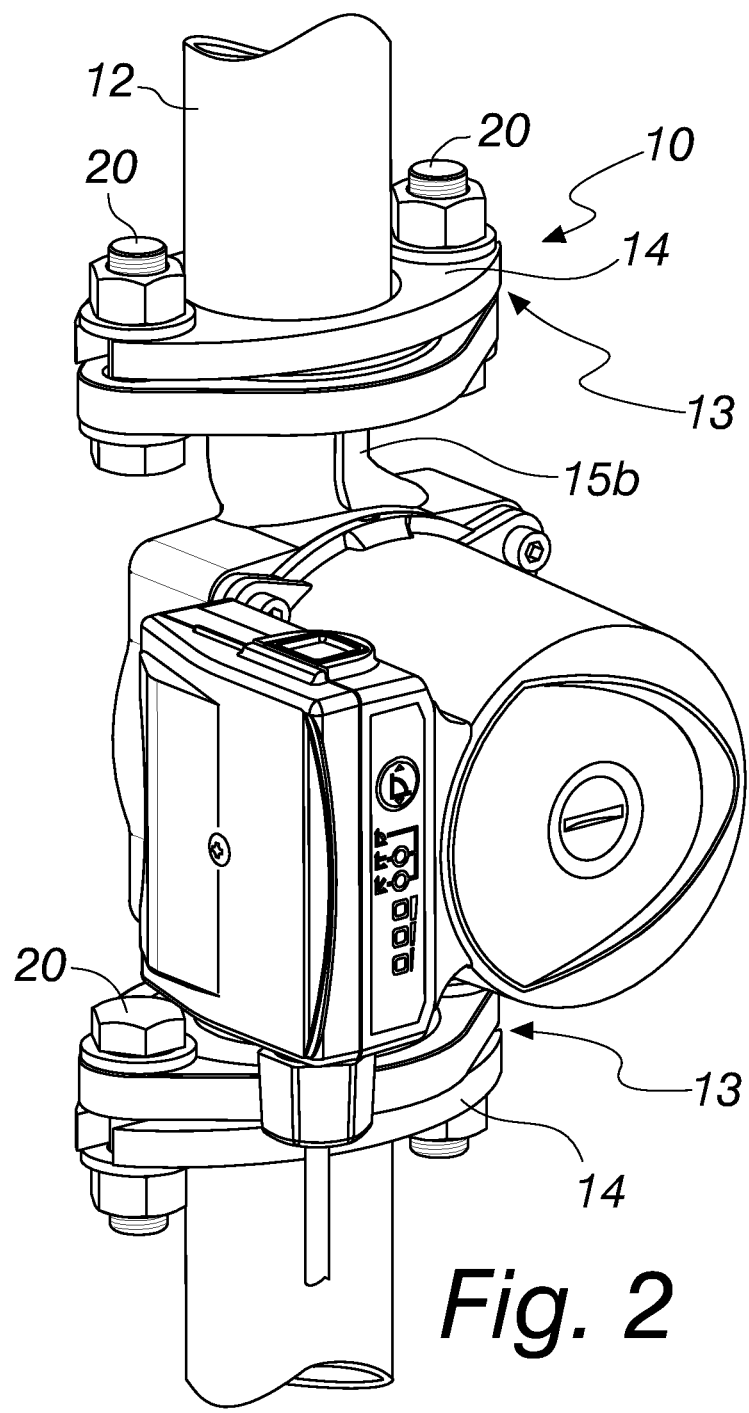
FIG. 2 is a perspective view of the pump body after connection to a pipe.

With reference to the figures, the device according to the invention is designated generally by the reference numeral 10.

It can be used in the connection of a pump body 11, for example a circulating pump, to a pipe 12 of a hydraulic system.

The device 10 comprises a planar flange 13 to be coupled to an end flange 14 of the pipe 12. The planar flange 13 has a thread on the inside diameter for its coupling to a tubular intake portion 15a or to a tubular delivery portion 15b of the pump body 11, which is threaded complementarily on its outside diameter.

Coupling occurs along the axis 16 of the tubular portion 15a or 15b.

In particular, the pump 21, which comprises the device 10, comprises at the end of each tubular intake portion 15a and delivery portion 15b a portion 17 for coupling to the planar flange 13, which has a larger outside diameter than the remaining part, at which it is threaded complementarily.

In the illustrated example, the planar flange 13 comprises two portions 18 for connection to the flange 14 of the pipe 12 to which the pump body 11 is to be connected.

The connecting portions 18 protrude outward in diametrically opposite positions and each have a hole 19 adapted to be crossed by screws 20 for tightening the planar flange 13 to the flange 14 of the pipe 12.

The use of the device according to the invention is as follows.

Prior to the installation of the pump, two planar flanges are associated with the two tubular portions, the intake portion 15*a* and the delivery portion 15*b*, by screwing them onto the coupling portions 17.

During installation, the holes 19 of each planar flange 13 must be arranged so as to match the holes of the respective flange 14 of the pipe 12, in order to allow their mutual tightening by means of the appropriately provided screws.

In this operation, the planar flanges 13, after they have been screwed, can be rotated, screwing them only partially, about the axis 16 of the tubular portions 15*a* and 15*b*, in order to move the holes 19 to the correct position. The thread has such a length as to ensure the coupling between the planar flanges 13 and the coupling portion 17 of the tubular portion 15*a* or 15*b* in any orientation of the planar flange 13.

By virtue of the thread, therefore, there is no risk that the planar flanges 13 might separate accidentally from the pump body 11 during installation, since they remain screwed on without falling, and at the same time said thread ensures the rotation of the pump body 11 with respect to the pipe 12.

From what has been described and illustrated it is evident that the proposed device 10 is structurally simple and easy to use.

Moreover, it allows the coupling of the pump body to a pipe that is already provided with flanges welded thereon.

In practice it has been found that the invention achieves the intended aim and objects, providing a device that allows to install a pump body in a hydraulic system easily and rapidly according to the most suitable orientation, even when the pipe of the system is already provided with flanges welded to its ends and without problems of instability of the planar flanges to be coupled to the intake and delivery portions.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

What is claimed is:

1. A combination of a pump having a pump body and a pipe of a hydraulic system, comprising a connecting device which connects said pump body to said pipe, said connecting device comprising a planar flange having a thread on an inside diameter of said planar flange for coupling of said planar flange to a tubular intake portion or delivery portion of said pump body, said tubular intake portion or delivery portion being threaded complementarily to said thread of said planar flange on an outside diameter of said tubular intake portion or delivery portion of said pump body, said planar flange having two mutually opposed completely planar surfaces without protuberances extending perpendicularly to said planar surfaces, said thread extending on said inside diameter of said planar flange entirely between said opposed planar surfaces of said planar flange, said planar flange comprising at least one connecting portion which connects to an end flange of said pipe, said at least one connecting portion of said planar flange and said end flange of said pipe each having at least one hole that is crossed by a screw for tightening said planar flange to said end flange of said pipe and thereby connecting said pump body to said pipe, wherein a planar surface of said end flange abuts one of said two mutually opposed completely planar surfaces of said planar flange.

2. The combination according to claim 1, said planar flange comprising two said connecting portions that protrude outward in diametrically opposite positions.

\* \* \* \* \*